United States Patent
Maiyuran et al.

(10) Patent No.: US 6,718,440 B2
(45) Date of Patent: Apr. 6, 2004

(54) MEMORY ACCESS LATENCY HIDING WITH HINT BUFFER

(75) Inventors: Subramaniam Maiyuran, Gold River, CA (US); Vivek Garg, Folsom, CA (US); Mohammad A. Abdallah, Folsom, CA (US); Jagannath Keshava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 09/966,587

(22) Filed: Sep. 28, 2001

(65) Prior Publication Data

US 2003/0065887 A1 Apr. 3, 2003

(51) Int. Cl.[7] .............................................. G06F 12/00
(52) U.S. Cl. ........................ 711/137; 711/117; 711/122; 711/154
(58) Field of Search ................................ 711/137, 117, 711/122, 154

(56) References Cited

U.S. PATENT DOCUMENTS

| | | | | |
|---|---|---|---|---|
| 5,325,508 A | * | 6/1994 | Parks et al. ................. | 711/118 |
| 5,732,242 A | * | 3/1998 | Mowry ........................ | 711/136 |
| 5,813,030 A | * | 9/1998 | Tubbs ......................... | 711/118 |
| 5,822,790 A | * | 10/1998 | Mehrotra .................... | 711/213 |
| 5,845,101 A | * | 12/1998 | Johnson et al. ............. | 712/207 |
| 6,237,064 B1 | | 5/2001 | Kumar et al. | |
| 6,240,488 B1 | * | 5/2001 | Mowry ........................ | 711/128 |
| 6,292,871 B1 | * | 9/2001 | Fuente ........................ | 711/136 |
| 2002/0010838 A1 | * | 1/2002 | Mowry ........................ | 711/128 |

OTHER PUBLICATIONS

Intel Architecture Optimization Reference Manual, Intel Corporation, Chapter 6, "Optimizing Cache Utilization for Pentium III Processors," pp 6–1 –6–30, 1999.*

Young et al., "On Instruction and Data Prefetch Mechanisms," pp 239–246, IEEE, 1995.*

Tomkins, et al., "Informed Multi–Process Prefetching and Caching," pp 100–114, ACM, 1997.*

Intel® Architecture Optimization Manual, Intel® Corporation, Order No. 242816–003, pp. 1–1 to 1–3 and 2–1 to 2–16 (1997).

Intel® Architecture Optimization Reference Manual, Intel® Corporation, Order No. 245127–001, pp. i–xx and 1–1 to 1–16 (1998, 1999).

Intel® Architecture Software Developer's Manual vol. 1: Basic Architecture, Intel® Corporation, Order No. 243190, pp. i–xvi, 1–1 to 1–10, and 2–1 to 2–14 (1999).

Intel® Architecture Software Developer's Manual vol. 3: System Programming, Intel® Corporation, Order No. 243192, pp. i–xxii, 1–1 to 1–10, and 9–1 to 9–40 (1999).

P6 Family of Processors Hardware Developer's Manual, Intel® Corporation, Order No. 244001–001, pp. i–vii, 1–1 to 1–2, and 2–1 to 2–7 (Sep. 1998).

* cited by examiner

Primary Examiner—Matthew Kim
Assistant Examiner—Stephen Elmore
(74) Attorney, Agent, or Firm—Blakely, Sokoloff, Taylor & Zafman LLP

(57) ABSTRACT

A request hint is issued prior to or while identifying whether requested data and/or one or more instructions are in a first memory. A second memory is accessed to fetch data and/or one or more instructions in response to the request hint. The data and/or instruction(s) accessed from the second memory are stored in a buffer. If the requested data and/or instruction(s) are not in the first memory, the data and/or instruction(s) are returned from the buffer.

23 Claims, 7 Drawing Sheets

MEMORY ACCESS LATENCY HIDING WITH HINT BUFFER

BACKGROUND OF THE INVENTION

1. Field of the Invention

The present invention relates generally to the field of computer systems. More particularly, the present invention relates to the field of memory access for computer systems.

2. Description of Related Art

A processor typically executes instructions at a faster clock speed relative to that for external memory, such as dynamic random access memory (DRAM) for example. Accessing external memory therefore introduces delays in the execution of instructions by the processor as the processor fetches both instructions to be executed and data to be processed in executing instructions from the memory at a relatively slower clock speed.

A typical processor may help minimize delays due to this memory access latency by processing instructions through a pipeline that fetches instructions from memory, decodes each instruction, executes the instruction, and retires the instruction. The operation of each stage of the pipeline typically overlaps in time those of the other stages to help hide memory access latencies in fetching instructions and data for instruction execution.

By identifying instructions that may be executed regardless of whether one or more prior fetched instructions are executed, a typical processor may also help minimize delays due to memory access latency by executing instructions in parallel, that is overlapping in time the execution of two or more instructions, and/or by executing instructions out of order. In this manner, the processor helps hide memory access latencies by continuing to execute instructions while waiting, for example, to fetch data for other instructions. Regardless of the order in which instructions are executed, the processor retires each instruction in order.

The processor may also help minimize memory latency delays by managing the out of order execution of relatively more instructions at any one time to help widen the window to fetch instructions and/or data from memory without introducing significant delays. The processor may, for example, use a larger instruction reorder buffer to manage at any one time relatively more instructions for out of order execution, a larger memory order buffer to manage at any one time relatively more data requests from memory for out of order data fetching, and/or a larger memory request queue to allow relatively more memory requests to be issued at any one time.

A typical processor may further help minimize memory access latency delays by using one or more relatively larger internal cache memories to store frequently accessed instructions and data. As the processor may then access such instructions and data internally, the processor helps reduce accesses to external memory.

Using larger buffers, queues, and/or cache memories, however, increases the cost and size of the processor.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for memory access latency hiding with hint buffer. In the following description, details are set forth such as specific processor architecture, memory types, etc., in order to provide a thorough understanding of the present invention. It will be evident, however, that the present invention may be practiced without these details. In other instances, well-known function blocks, interfaces, etc., have not been described in particular detail so as not to obscure the present invention.

EXEMPLARY COMPUTER SYSTEM

Figure 1:
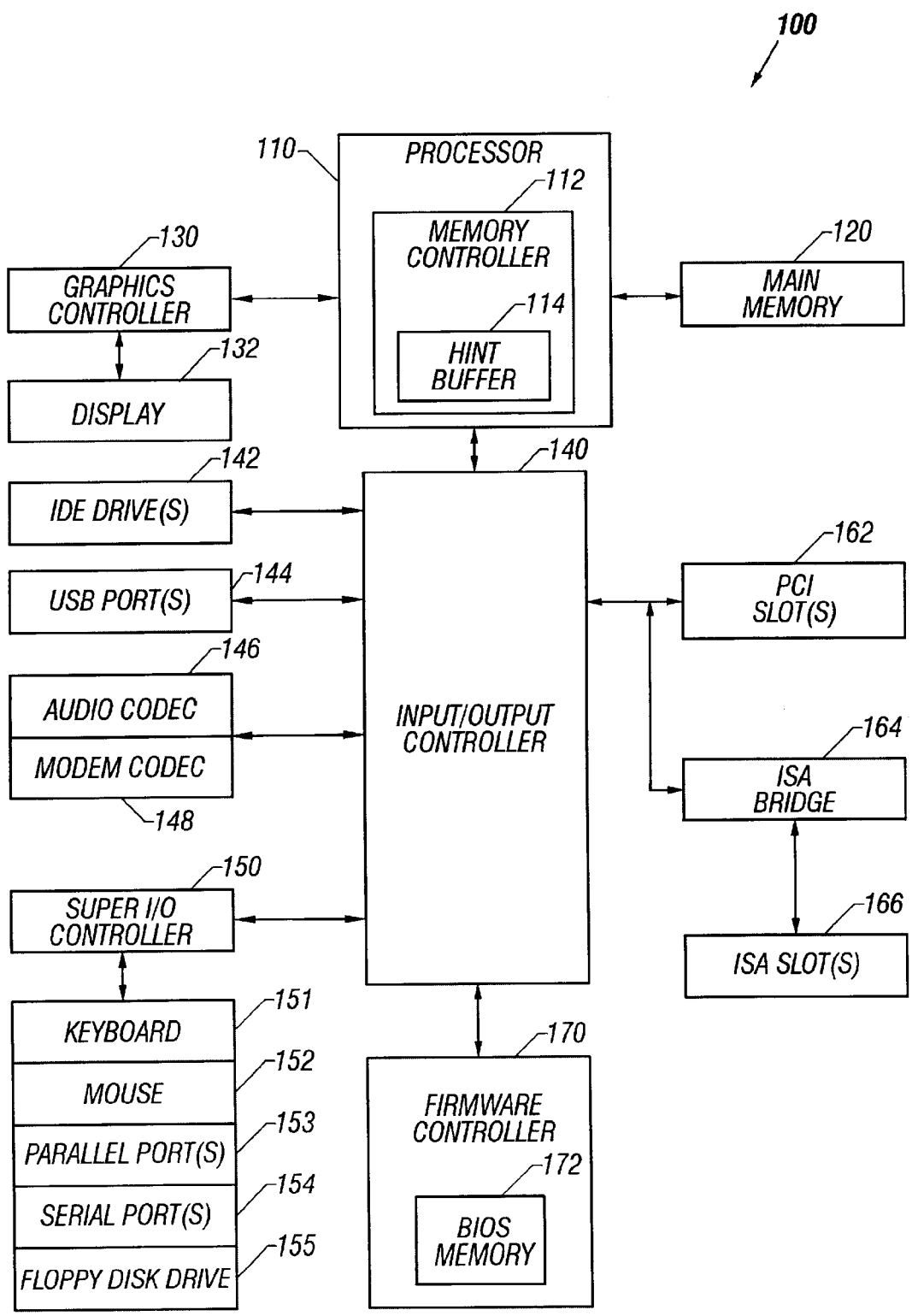
FIG. 1 illustrates an exemplary computer system comprising a processor having an integrated memory controller comprising a hint buffer to help hide memory access latencies.

FIG. 1 illustrates an exemplary computer system 100 comprising a processor 110 having a memory controller 112 comprising a hint buffer 114 to help hide memory access latencies. Although described in the context of computer system 100, the present invention may be implemented in any suitable computer system comprising any suitable one or more integrated circuits.

As illustrated in FIG. 1, memory controller 112 for one embodiment is integrated on the same chip with processor 110. Integrated memory controller 112 with processor 110 helps reduce delays in communicating with memory controller 112. Memory controller 112 for another embodiment may be formed as a separate integrated circuit chip that either shares the same package as processor 110 or is packaged separately from processor 110. Processor 110 may comprise any suitable processor architecture and for one embodiment comprises an Intel® 32-bit architecture as defined by Intel® Corporation of Santa Clara, Calif.

Memory controller 112 controls access to main memory 120 by processor 110. Main memory 120 is coupled to memory controller 112 to load and store data and/or instructions, for example, for computer system 100, including processor 110. Main memory 120 may comprise any suitable memory such as, for example, a dynamic random access memory (DRAM). Main memory 120 may comprise, for example, synchronous DRAM (SDRAM), double data rate SDRAM (DDR SDRAM), or Rambus® DRAM (RDRAM). Processor 110 for one embodiment operates at a faster clock speed relative to memory controller 112 and main memory 120.

Memory controller 112 for one embodiment uses hint buffer 114 to help hide memory access latencies for processor 110 as processor 110 fetches from main memory 120 instructions to be executed and/or data to be processed in executing instructions. Memory controller 112 for one embodiment receives a request hint for data and/or one or more instructions requested by processor 110 even though processor 110 may or may not use the requested data and/or instruction(s) until later, if at all, and/or even though processor 110 may or may not need the requested data and/or instruction(s) from main memory 120. Memory controller 112 may then initiate access to main memory 120 in response to the received request hint prior to receiving a memory fetch request for the data and/or instruction(s) and store the requested data and/or instruction(s) in hint buffer 114. The memory fetch request may be issued to memory controller 112, for example, when the requested data and/or instruction(s) may likely be used by processor 110 and are needed from main memory 120.

When memory controller 112 receives the memory fetch request, memory controller 112 may have already accessed main memory 120 to fetch the requested data and/or instruction(s). Memory controller 112 may then return the requested data and/or instruction(s) from hint buffer 114 for use by processor 110.

As returning the requested data and/or instruction(s) from hint buffer 114 is quicker relative to accessing main memory 120 when memory controller 112 receives the memory fetch request, processor 110 may effectively hide the latency associated with accessing main memory 120 by speculatively accessing main memory 120 for data and/or instruction(s) prior to receiving the memory fetch request for the data and/or instruction(s). Also, processor 110 may help reduce the average memory access latency by accessing main memory 120 for request hints when main memory 120 is idle. In this manner, processor 110 may more fully use the bandwidth for accessing main memory 120.

Memory controller 112 for one embodiment also controls access to main memory 120 to store and fetch data and/or one or more instructions for a graphics controller 130 and/or an input/output (I/O) controller 140, for example.

Graphics controller 130 is coupled to processor 110 to control the display of information on a suitable display 132, such as a cathode ray tube (CRT) or liquid crystal display (LCD) for example, coupled to graphics controller 130. Memory controller 112 for one embodiment interfaces with graphics controller 130 through an accelerated graphics port (AGP).

I/O controller 140 is coupled to processor 110 to provide an interface to one or more I/O devices coupled to I/O controller 140. I/O controller 140 for one embodiment interfaces with memory controller 112 through a hub interface.

For one embodiment, I/O controller 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. I/O controller 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. I/O controller 140 for one embodiment further provides an interface to one or more suitable peripheral component interconnect (PCI) devices coupled to I/O controller 140 through one or more PCI slots 162 on a PCI bus and an interface to one or more suitable industry standard architecture (ISA) devices coupled to I/O controller 140 by the PCI bus through an ISA bridge 164. ISA bridge 164 interfaces with one or more ISA devices through one or more ISA slots 166 on an ISA bus.

I/O controller 140 is also coupled to a firmware controller 170 to provide an interface to firmware controller 170. Firmware controller 170 for one embodiment interfaces with I/O controller 140 through a hub interface. Firmware controller 170 for one embodiment may share at least a portion of the interface between I/O controller 140 and super I/O controller 150. Firmware controller 170 comprises a basic input/output system (BIOS) memory 172 to store suitable system and/or video BIOS software. BIOS memory 172 may comprise any suitable non-volatile memory, such as a flash memory for example.

Although illustrated as having only one processor 110, computer system 100 for another may comprise a plurality of processors, such as two, three, or more for example. Processor 110 may be coupled to one or more other processors over a common bus. Each processor may then share memory controller 112 to access, for example, main memory 120, graphics controller 130, and/or I/O controller 140.

PROCESSOR HAVING MEMORY CONTROLLER COMPRISING HINT BUFFER

Figure 2:
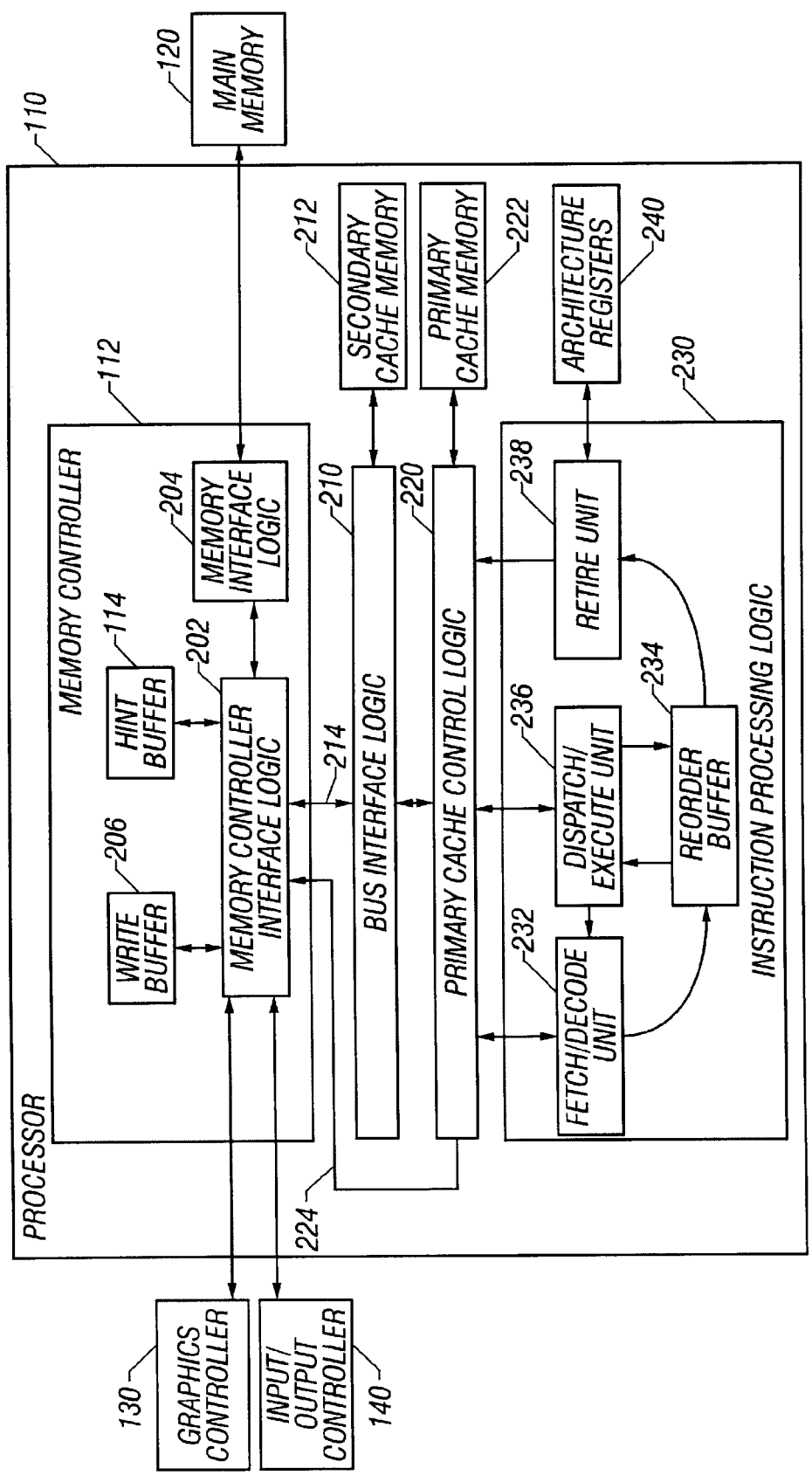
FIG. 2 illustrates, for one embodiment, a processor having an integrated memory controller comprising a hint buffer to help hide memory access latencies.

As illustrated in FIG. 2, processor 110 for one embodiment comprises memory controller 112, bus interface logic 210 coupled to memory controller 112, secondary cache memory 212 coupled to bus interface logic 210, primary cache control logic 220 coupled to bus interface logic 210, primary cache memory 222 coupled to primary cache control logic 220, instruction processing logic 230 coupled to primary cache control logic 220, and architecture registers 240 coupled to instruction processing logic 230.

Bus interface logic 210, secondary cache memory 212, primary cache control logic 220, and primary cache memory 222 form a two cache level memory subsystem to provide instructions and/or data for instruction processing logic 230.

Bus interface logic 210 controls secondary cache memory 212 to store and fetch instructions and/or data for instruction processing logic 230. Bus interface logic 210 for one embodiment stores in secondary cache memory 212 instructions and/or data accessed from main memory 120 through memory controller 112 for processing by instruction processing logic 230. Bus interface logic 210 for one embodiment also stores in secondary cache memory 212 recently and/or frequently used instructions and/or data to help minimize accesses to main memory 120. Bus interface logic 210 may comprise any suitable circuitry, and secondary cache memory 212 may comprise any suitable memory of any suitable size.

Primary cache control logic 220 controls primary cache memory 222 to store and fetch instructions and/or data for instruction processing logic 230. For one embodiment, primary cache memory 222 may comprise a dedicated instruction cache memory portion and a separate dedicated data cache memory portion. Primary cache control logic 220 for one embodiment stores in primary cache memory 222 instructions and/or data accessed from secondary cache memory 212 through bus interface logic 210 or from main memory 120 through bus interface logic 210 and memory controller 112 for processing by instruction processing logic 230. Primary cache control logic 220 for one embodiment also stores in primary cache memory 222 recently and/or frequently used instructions and/or data to help minimize accesses to main memory 120. Primary cache control logic 220 may comprise any suitable circuitry, and primary cache memory 222 may comprise any suitable memory of any suitable size.

Primary cache memory 222 for one embodiment is relatively small in size and closely coupled to instruction processing logic 230 through primary cache control logic 220 to allow relatively quicker access to instructions and/or data stored in primary cache memory 222 by instruction processing logic 230. Secondary cache memory 212 for one embodiment is larger in size relative to primary cache memory 222 to store more instructions and/or data relative to primary cache memory 222. The time to access instructions and/or data from secondary cache memory 212 for instruction processing logic 230 for one embodiment is longer relative to accessing primary cache memory 222. Bus interface logic 210, secondary cache memory 212, primary cache control logic 220, and primary cache memory 222 may store instructions and/or data for instruction processing logic 230 in accordance with any suitable caching scheme.

Although described as comprising bus interface logic 210, secondary cache memory 212, primary cache control logic 220, and primary cache memory 222, processor 110 may comprise any other suitable memory subsystem for loading and storing instructions and data for instruction processing logic 230.

Instruction processing logic 230 may comprise any suitable circuitry to fetch and process instructions and/or data. Instruction processing logic 230 for one embodiment, as illustrated in FIG. 2, comprises an instruction pipeline comprising a fetch/decode unit 232, a reorder buffer 234, a dispatch/execute unit 236, and a retire unit 238. Fetch/decode unit 232 is coupled to primary cache control logic 220. Reorder buffer 234 is coupled to fetch/decode unit 232, dispatch/execute unit 236, and retire unit 238. Dispatch/execute unit 236 is coupled to fetch/decode unit 232 and primary cache control logic 220. Retire unit 238 is coupled to architecture registers 240 and to primary cache control logic 220.

Fetch/decode unit 232 fetches instructions from primary cache memory 222, secondary cache memory 212, and/or main memory 120. Fetch/decode unit 232 may comprise any suitable circuitry to fetch instructions in any suitable manner. Fetch/decode unit 232 for one embodiment identifies a next instruction to be fetched by instruction processing logic 230 in accordance with an instruction pointer maintained by fetch/decode unit 232 and requests the instruction from primary cache memory 222, secondary cache memory 212, or main memory 120 through primary cache control logic 220, bus interface logic 210, and/or memory controller 112. Fetch/decode unit 232 may identify the next instruction, for example, as the next sequential instruction in a program, as a predicted or actual destination of a branch instruction, or as the start of a new routine, such as an exception handling routine for example.

Fetch/decode unit 232 for one embodiment decodes each instruction into one or more micro-operations. Fetch/decode unit 232 for one embodiment decodes each instruction into one or more triadic micro-operations. A triadic micro-operation comprises an operation code or opcode and may comprise up to two logical source operands and one logical destination operand.

Fetch/decode unit 232 for one embodiment maps any sources and renames any destinations for each micro-operation for the fetched instruction. Fetch/decode unit 232 for one embodiment converts logical register references to physical register references and in so doing forms dependency links between physical destinations and sources using a rename map.

Fetch/decode unit 232 allocates each micro-operation for the fetched instruction in reorder buffer 234. In entering micro-operations in reorder buffer 234, fetch/decode unit 232 for one embodiment adds status information to the micro-operations to prepare them for out-of-order execution.

Reorder buffer 234 receives and stores each micro-operation from fetch/decode unit 232. Reorder buffer 234 also stores micro-operations that have already been executed by dispatch/execute unit 236 but not yet retired. Reorder buffer 234 may comprise any suitable circuitry and for one embodiment comprises an array of content-addressable memory (CAM).

Dispatch/execute unit 236 dispatches micro-operations stored in reorder buffer 234 for execution and executes dispatched micro-operations. Dispatch/execute unit 236 schedules and executes micro-operations stored in reorder buffer 234 in accordance with data dependencies among such micro-operations and execution resource availability and therefore supports out-of-order execution of micro-operations. Dispatch/execute unit 236 stores any result of executing a micro-operation with that micro-operation in reorder buffer 234.

Dispatch/execute unit 236 may comprise any suitable circuitry. For one embodiment, dispatch/execute unit 236 comprises a reservation station and a plurality of execution units, such as one or more integer execution units, one or more floating point execution units, and a memory interface execution unit for example. The reservation station scans the status of micro-operations in reorder buffer 234 to identify micro-operations that are ready to be executed, such as micro-operations having available source operands for example. The reservation station dispatches each ready micro-operation to an appropriate execution unit available to execute the micro-operation. Each execution unit returns any result of executing a micro-operation to reorder buffer 234, either directly or through the reservation station, to store the result with the corresponding micro-operation in reorder buffer 234.

Dispatch/execute unit 236 for one embodiment executes one or more memory load micro-operations by having the reservation station dispatch the memory load micro-operation to a memory interface execution unit coupled to primary cache control logic 220 to request data from primary cache memory 222, secondary cache memory 212, or main memory 120 through primary cache control logic 220, bus interface logic 210, and/or memory controller 112.

Retire unit 238 retires executed micro-operations. Retire unit 238 for one embodiment scans the status of micro-operations in reorder buffer 234, removes executed micro-operations from reorder buffer 234, and commits the results of executed micro-operations to machine state, that is to architecture registers 240 and to main memory 120 through primary cache control logic 220, bus interface logic 210, and memory controller 112. Retire unit 238 for one embodiment retires executed micro-operations in accordance with the order in which their respective instructions were fetched and decoded by fetch/decode unit 232. Retire unit 238 may comprise any suitable circuitry to retire executed micro-operations in any suitable manner.

Although described in the context of instruction processing logic 230 as illustrated in FIG. 2, the present invention may be implemented using any other suitable processor architecture that processes instructions.

For another embodiment, for example, fetch/decode unit 232 may allocate micro-operations in the reservation station, for example, of dispatch/execute unit 236 rather than in reorder buffer 234. Upon dispatching and executing allocated micro-operations, dispatch/execute unit 236 may then store any results in reorder buffer 234 for retirement by retire unit 238.

Fetch/decode unit 232 for another embodiment may not decode one or more fetched instructions into micro-operations but rather may process each instruction for execution directly.

HIDING MEMORY ACCESS LATENCY

Figure 3A:
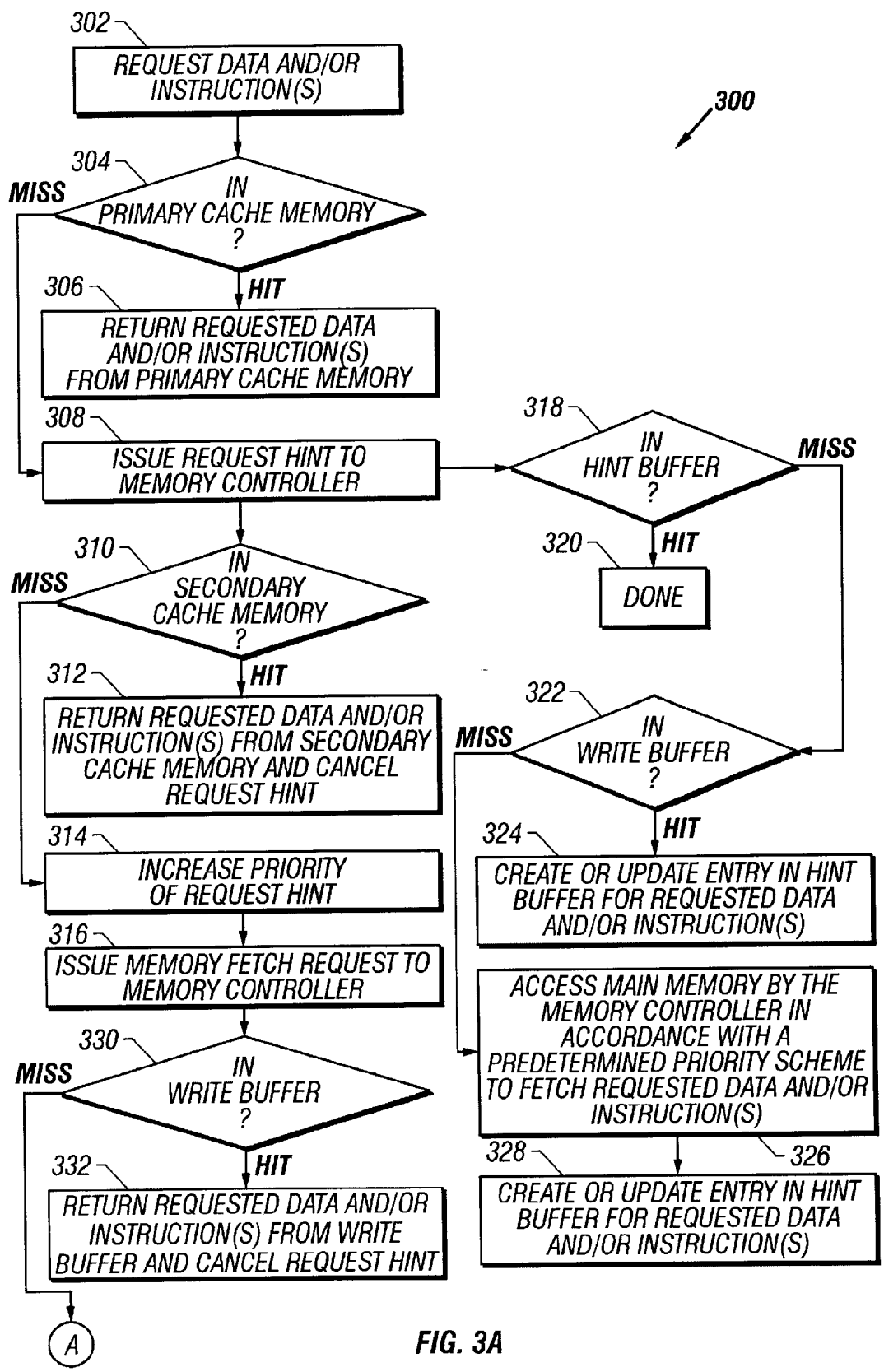
FIG. 3, which is formed by FIGS. 3A and 3B, illustrates, for one embodiment, a flow diagram to perform a memory fetch request using a memory controller comprising a hint buffer.
Figure 3B:
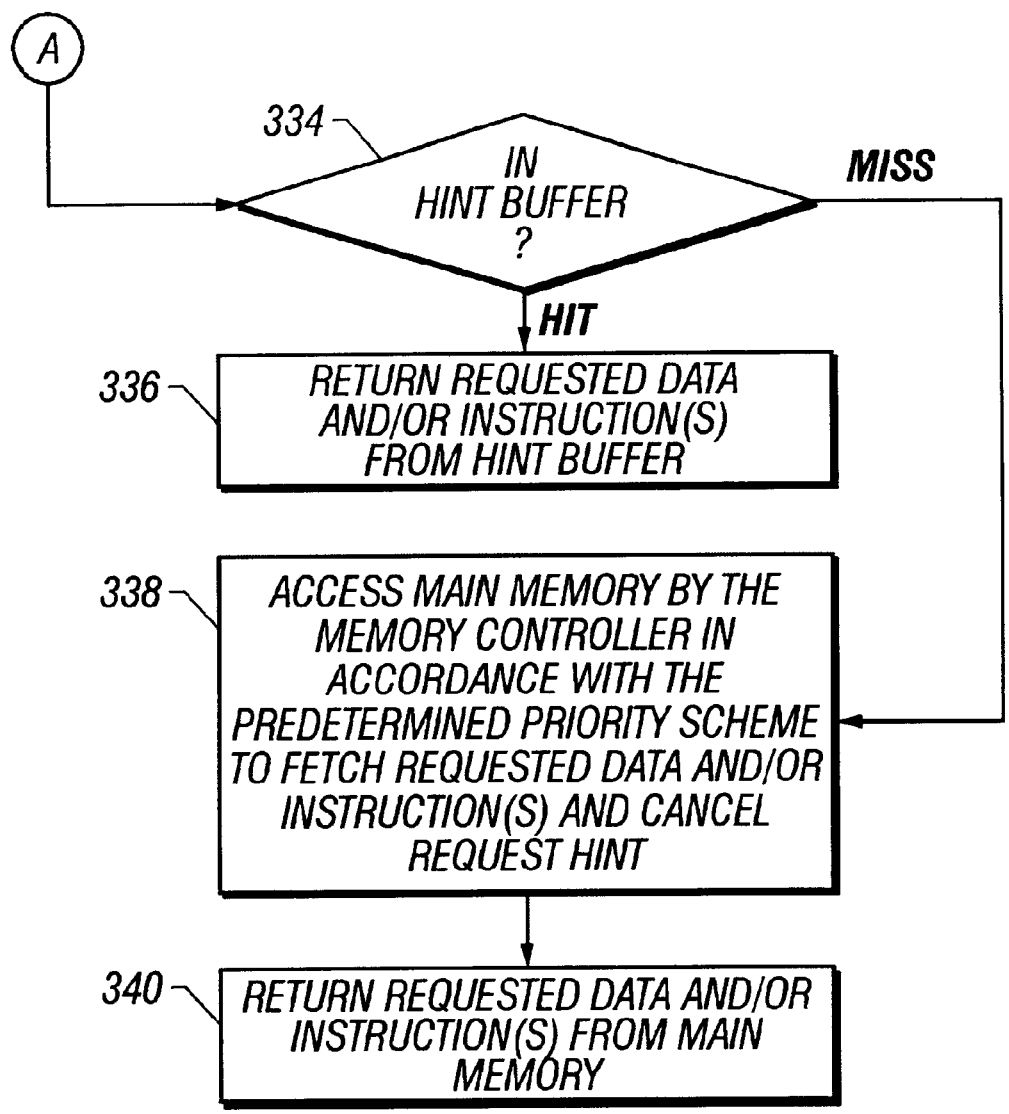

Processor 110 for one embodiment helps hide latencies in accessing main memory 120 using memory controller 112 in accordance with a flow diagram 300 of FIG. 3.

Memory controller 112 may comprise any suitable circuitry to help hide memory access latencies for processor 110. As illustrated in FIG. 2, memory controller 112 for one embodiment comprises memory controller interface logic 202 coupled to bus interface logic 210, to graphics controller 130, and to I/O controller 140; memory interface logic 204 coupled to memory controller interface logic 202 and to main memory 120; hint buffer 114 coupled to memory controller interface logic 202; and a write buffer 206 coupled to memory controller interface logic 202.

Memory controller interface logic 202 and memory interface logic 204 may each comprise any suitable circuitry. Because memory interface logic 204 is to access main memory 120, the circuitry for memory interface logic 204 may depend, for example, on the type of memory used by main memory 120. Hint buffer 114 and write buffer 206 may each comprise any suitable circuitry and for one embodiment each comprise an array of content-addressable memory (CAM) of any suitable size.

For block 302 of FIG. 3, instruction processing logic 230 requests data and/or one or more instructions. As one example, fetch/decode unit 232 may request an instruction. As another example, dispatch/execute unit 236 may request data. Instruction processing logic 230 for one embodiment requests data and/or one or more instructions from primary cache memory 222 by issuing a suitable memory fetch request to primary cache control logic 220. Suitable memory fetch requests include, without limitation, cacheable memory read requests, cacheable lock transactions, and uncacheable memory read requests, for example.

For block 304, primary cache control logic 220 identifies whether the requested data and/or instruction(s) are stored in primary cache memory 222. If so, that is if primary cache memory 222 signals a cache hit, primary cache control logic 220 for block 306 returns the requested data and/or instruction(s) from primary cache memory 222 to instruction processing logic 230. If not, that is if primary cache memory 222 signals a cache miss, primary cache control logic 220 issues the memory fetch request to bus interface logic 210.

For block 308, a request hint is issued to memory controller 112. For one embodiment, primary cache control logic 220 issues the request hint to memory controller 112 over a bus 224 coupled to primary cache control logic 220 and to memory controller 112. Bus 224 for one embodiment is substantially dedicated to transmitting request hints to help expedite transmission of the request to memory controller 112. For another embodiment, bus interface logic 210 issues the request hint to memory controller 112 over a bus 214 coupled to bus interface logic 210 and to memory controller 112 in response to receiving the memory fetch request from primary cache control logic 220. Bus interface logic 210 for one embodiment issues the request hint over bus 214 among other memory requests and/or request hints in accordance with a predetermined priority scheme. Bus interface logic 210 for another embodiment issues the request hint over a portion of bus 214 substantially dedicated to transmitting request hints.

The request hint identifies the requested data and/or instruction(s) to memory controller 112. The request hint for one embodiment comprises a request type identifying the request as a request hint and an address at which the requested data and/or instruction(s) reside. The request hint for one embodiment may also comprise a stride. Memory controller interface logic 202 for one embodiment receives the request hint and assigns the request hint a priority of speculative.

For block 310, bus interface logic 210 identifies whether the requested data and/or instruction(s) are stored in secondary cache memory 212. If so, that is if secondary cache memory 212 signals a cache hit, bus interface logic 210 for block 312 returns the requested data and/or instruction(s) from secondary cache memory 212 to instruction processing logic 230 through primary cache control logic 220. Primary cache control logic 220 for one embodiment may also optionally store the requested data and/or instruction(s) in primary cache memory 222. Bus interface logic 210 for one embodiment may optionally notify memory controller 112 for block 312 to cancel the request hint previously issued to memory controller 112 to avoid unnecessarily accessing main memory 120. If the requested data and/or instruction(s) are not stored in secondary cache memory 212, that is if secondary cache memory 212 signals a cache miss, bus interface logic 210 for one embodiment notifies memory controller 112 over bus 214 to increase the priority of the request hint for block 314. For another embodiment, bus interface logic 210 may be coupled to bus 224 to notify memory controller 112 over bus 224 to cancel the request hint or to increase the priority of the request hint.

Bus interface logic 210 notifies memory controller 112 to increase the priority of the request hint to help expedite the performance of the request hint by memory controller 112 as memory controller 112 is to perform the memory fetch request. Notifying memory controller 112 to increase the priority of the request hint is optional. Memory controller interface logic 202 for one embodiment for block 314 increases the priority of the request hint from speculative to demand.

For block 316, bus interface logic 210 issues the memory fetch request over bus 214 to memory controller 112. Bus interface logic 210 for one embodiment issues the request hint over bus 214 among other memory requests and/or request hints in accordance with a predetermined priority scheme.

Primary cache control logic 220 or bus interface logic 210 issues the request hint for block 308 prior to or while bus interface logic 210 identifies whether the requested data and/or instruction(s) are stored in secondary cache memory 212. In this manner, memory controller 112 has an opportunity to initiate access to main memory 120 to fetch the requested data and/or instruction(s) prior to receiving the memory fetch request for block 316, thereby helping to hide memory access latency by overlapping the latency incurred in accessing main memory 120 with latencies incurred, for example, in checking secondary cache memory 212 and issuing the memory fetch request to memory controller 112.

In response to receiving the request hint, memory controller interface logic 202 for block 318 identifies whether the requested data and/or instruction(s) are stored in hint buffer 114. If so, that is if hint buffer 114 signals a hit, memory controller 112 for block 320 is done processing the request hint. Memory controller interface logic 202 for one embodiment does not yet return the requested data and/or instruction(s) to the requester for the request hint. Hint buffer 114 for one embodiment may already be storing the requested data and/or instruction(s) due to a prior request hint. If the requested data and/or instruction(s) are not already stored in hint buffer 114, that is if hint buffer 114 signals a miss, memory controller interface logic 202 may optionally create an entry in hint buffer 114 at this time for the requested data and/or instruction(s) and for block 322 identifies whether the requested data and/or instruction(s) are stored in write buffer 206.

Write buffer 206 stores data and/or instruction(s) that are to be written to main memory 120. In response to receiving a memory write request from instruction processing logic 230, for example, memory controller interface logic 202 writes the data and/or instruction(s) for the memory write request to write buffer 206. In this manner, the memory write request is considered completed by instruction processing logic 230 while memory controller interface logic 202 may continue accessing main memory 120 for other memory requests. Memory controller interface logic 202 may then later access main memory 120 to perform the memory write request, for example, when requests to access main memory 120 have slowed or when write buffer 206 is to be flushed.

Memory controller interface logic 202 for block 322 identifies whether the requested data and/or instruction(s) are stored in write buffer 206 because write buffer 206 may be storing updated data and/or instruction(s) that have not been stored in main memory 120. If the requested data and/or instruction(s) are already stored in write buffer 206, that is if write buffer 206 signals a hit, memory controller interface logic 202 for block 324 creates or updates in hint buffer 114 an entry for the requested data and/or instruction(s). The entry in hint buffer 114 may be created or updated either to store a copy of the updated data and/or instruction(s) stored in write buffer 206 or to store an indication that the requested data and/or instruction(s) are stored in write buffer 206. Memory controller interface logic 202 for one embodiment does not yet return the requested data and/or instruction(s) to the requester for the request hint.

If the requested data and/or instruction(s) are not stored in write buffer 206, that is if write buffer 206 signals a miss, memory controller interface logic 202 may optionally create an entry in hint buffer 114 at this time for the requested data and/or instruction(s).

Memory controller interface logic 202 for another embodiment may optionally skip checking hint buffer 114 for block 318, for example, where memory controller interface logic 202 invalidates requested data and/or instruction(s) in hint buffer 114 for prior request hints once returned in response to a memory fetch request. Memory controller interface logic 202 for another embodiment may optionally skip checking write buffer 206 for block 322, for example, where memory controller 112 does not comprise write buffer 206.

If the requested data and/or instruction(s) are not stored in hint buffer 114, if checked, or write buffer 206, if checked, memory controller interface logic 202 for block 326 accesses main memory 120 in accordance with a predetermined priority scheme to fetch the requested data and/or instruction(s).

As memory controller interface logic 202 may receive a plurality of memory requests and request hints from, for example, instruction processing logic 230, graphics controller 130, and/or I/O controller 140, memory controller interface logic 202 for one embodiment arbitrates between or among pending memory requests and request hints in accordance with the predetermined priority scheme for access to main memory 120. As one example, memory controller interface logic 202 may prioritize memory fetch requests originating from graphics controller 130, for example, over both request hints and memory fetch requests originating from instruction processing logic 230, for example. As another example, memory controller interface logic 202 may prioritize memory fetch requests originating from instruction processing logic 230 over demand request hints originating from instruction processing logic 230 and may prioritize demand request hints originating from instruction processing logic 230 over speculative request hints originating from instruction processing logic 230. By prioritizing memory fetch requests over request hints, memory controller interface logic 202 helps reduce the average memory access latency by accessing main memory 120 for request hints when main memory 120 would otherwise be idle. Memory controller interface logic 202 therefore helps spread out accesses to main memory 120, and therefore more fully uses the bandwidth for accessing main memory 120. Spreading out accesses to main memory 120 may also help to minimize bus conflicts with any other device sharing main memory 120.

When memory controller interface logic 202 determines main memory 120 may be accessed to fetch the requested data and/or instruction(s) for the request hint, memory controller interface logic 202 issues the request hint to memory interface logic 204. Memory interface logic 204 accesses main memory 120 to fetch the requested data and/or instruction(s) in accordance with the request hint. Memory interface logic 204 returns the fetched data and/or instruction(s) to memory controller interface logic 202, and memory controller interface logic 202 for block 328 creates or updates in hint buffer 114 an entry for the requested data and/or instruction(s) to store a copy of the requested data and/or instruction(s) accessed from main memory 120. Memory controller interface logic 202 for one embodiment does not yet return the requested data and/or instruction(s) to the requester for the request hint.

In response to receiving the memory fetch request issued for block 316, memory controller interface logic 202 for block 330 identifies whether the requested data and/or instruction(s) are stored in write buffer 206. Memory controller interface logic 202 for one embodiment may check write buffer 206 directly for block 330. Memory controller interface logic 202 for one embodiment for block 330 may also check hint buffer 114 which may indicate the requested data and/or instruction(s) are stored in write buffer 206. If the requested data and/or instruction(s) are stored in write buffer 206, memory controller interface logic 202 for block 332 returns the requested data and/or instruction(s) from write buffer 206 to instruction processing logic 230 through bus interface logic 210 and primary cache control logic 220. Bus interface logic 210 for one embodiment may also optionally store the requested data and/or instruction(s) in secondary cache memory 212. Primary cache control logic 220 for one embodiment may also optionally store the requested data and/or instruction(s) in primary cache memory 222. Memory controller interface logic 202 for one embodiment for block 332 may also optionally cancel the request hint and/or invalidate any corresponding entry in hint buffer 114.

If the requested data and/or instruction(s) are not stored in write buffer 206, that is if write buffer 206 signals a miss, memory controller interface logic 202 for block 334 identifies whether the requested data and/or instruction(s) are stored in hint buffer 114. If so, that is if hint buffer 114 signals a hit, memory controller interface logic 202 for block 336 returns the requested data and/or instruction(s) from hint buffer 114 to instruction processing logic 230 through bus interface logic 210 and primary cache control logic 220. Bus interface logic 210 for one embodiment may also optionally store the requested data and/or instruction(s) in secondary cache memory 212. Primary cache control logic 220 for one embodiment may also optionally store the requested data and/or instruction(s) in primary cache memory 222. Memory controller interface logic 202 for one embodiment for block 336 may also optionally invalidate the corresponding entry in hint buffer 114.

If the requested data and/or instruction(s) are not stored in hint buffer 114, that is if hint buffer 114 signals a miss, memory controller interface logic 202 for block 338 accesses main memory 120 in accordance with the predetermined priority scheme to fetch the requested data and/or instruction(s). Memory controller interface logic 202 for one embodiment for block 338 may optionally cancel the corresponding request hint and/or invalidate any corresponding entry in hint buffer 114.

When memory controller interface logic 202 determines main memory 120 may be accessed to fetch the requested data and/or instruction(s) for the memory fetch request, memory controller interface logic 202 issues the memory fetch request to memory interface logic 204. Memory interface logic 204 accesses main memory 120 to fetch the requested data and/or instruction(s) in accordance with the memory fetch request. Memory interface logic 204 returns the fetched data and/or instruction(s) to memory controller interface logic 202, and memory controller interface logic 202 for block 340 returns the requested data and/or instruction(s) from main memory 120 to instruction processing logic 230 through bus interface logic 210 and primary cache control logic 220. Memory controller interface logic 202 for one embodiment may optionally store the requested data and/or instruction(s) in hint buffer 114. Bus interface logic 210 for one embodiment may also optionally store the requested data and/or instruction(s) in secondary cache memory 212. Primary cache control logic 220 for one embodiment may also optionally store the requested data and/or instruction(s) in primary cache memory 222.

Memory controller interface logic 202 for another embodiment where hint buffer 114 may store an indication that the requested data and/or instruction(s) are stored in write buffer 206 may optionally check hint buffer 114 first and then check write buffer 206 only if the corresponding entry in hint buffer 114 indicates the requested data and/or instruction(s) are stored in write buffer 206. Memory controller interface logic 202 for another embodiment may optionally skip checking write buffer 206, for example, where memory controller 112 does not comprise write buffer 206 or where memory controller interface logic 202 updates hint buffer 114 each time memory controller interface logic 202 updates or stores corresponding data and/or instruction(s) in write buffer 206.

Figure 4:
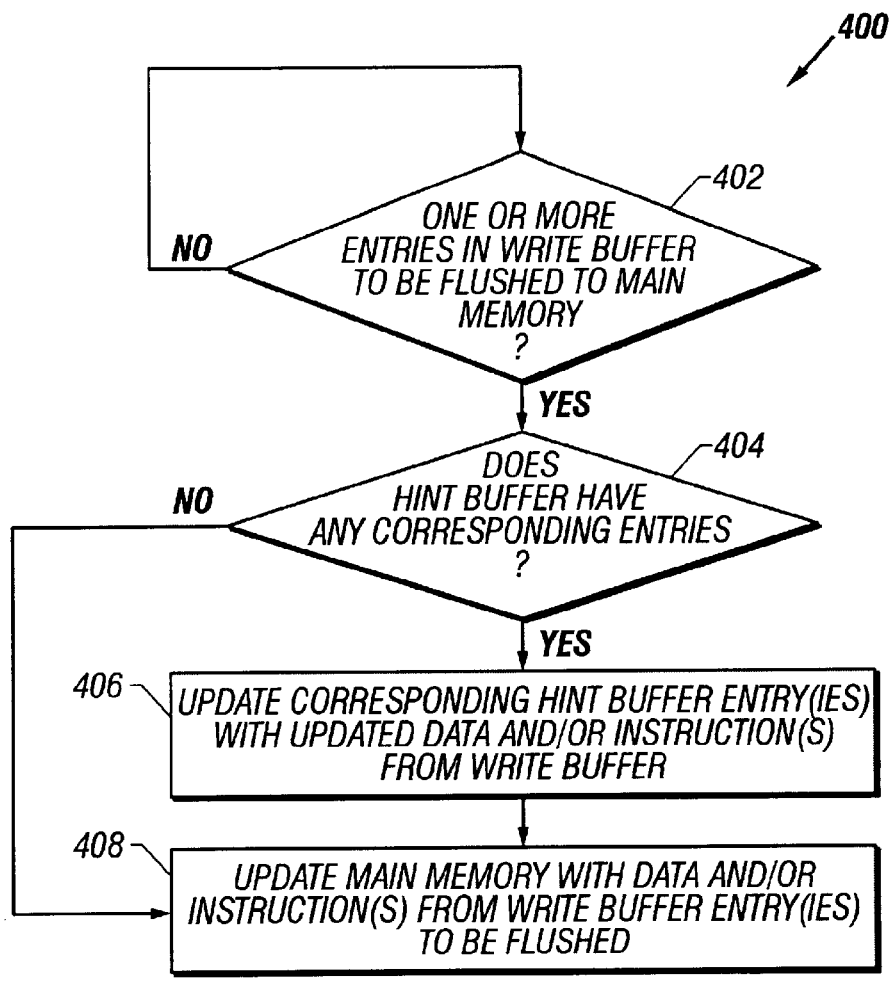
FIG. 4 illustrates, for one embodiment, a flow diagram to flush one or more write buffer entries to a main memory.

For one embodiment where hint buffer 114 may store an indication that the requested data and/or instruction(s) are stored in write buffer 206, memory controller interface logic 202 accounts for flushing of one or more entries in write buffer 206 in accordance with a flow diagram 400 as illustrated in FIG. 4.

For block 402 of FIG. 4, memory controller interface logic 202 determines whether one or more entries in write buffer 206 are to be flushed to main memory 120. Memory controller interface logic 202 may determine one or more entries in write buffer 206 are to be flushed, for example, because write buffer 206 stores at least a predetermined number of entries, because access to main memory 120 has slowed, and/or because data and/or instruction(s) have been updated in write buffer 206 while a memory fetch request for that data and/or instruction(s) is pending. Memory controller interface logic 202 for one embodiment determines all entries in write buffer 206 are to be flushed if memory controller interface logic 202 determines any entries in write buffer 206 are to be flushed.

If one or more entries of write buffer 206 are to be flushed, memory controller interface logic 202 determines for block 404 whether hint buffer 114 has any entries corresponding to an entry in write buffer 206 to be flushed. If so, memory controller interface logic 202 updates each corresponding entry in hint buffer 114 with a copy of the corresponding updated data and/or instruction(s) from write buffer 206.

Whether or not hint buffer 114 has any entries corresponding to an entry in write buffer 206 to be flushed, memory controller interface logic 202 updates main memory 120 with the updated data and/or instruction(s) from each entry in write buffer 206 to be flushed.

For another embodiment where hint buffer 114 may store an indication that the requested data and/or instruction(s) are stored in write buffer 206, memory controller interface logic 202 accounts for flushing of one or more entries in write buffer 206 by writing one or more entries of write buffer 206 to be flushed to main memory 120 and then issuing request hints for corresponding entries in hint buffer 114 to access main memory 120 to fetch the requested data and/or instruction(s).

Figure 5:
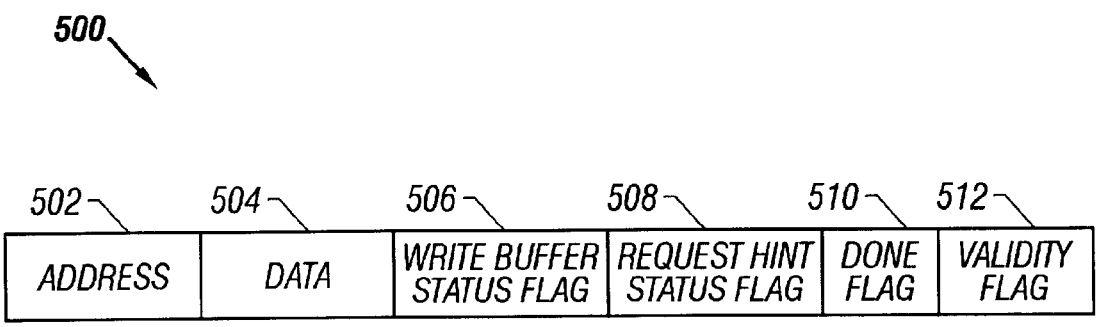
FIG. 5 illustrates, for one embodiment, an entry in a hint buffer.

FIG. 5 illustrates, for one embodiment, an entry 500 for hint buffer 114. Hint buffer 114 may store any suitable number of entries.

Entry 500 comprises an address field 502 and a data field 504. Entry 500 also comprises various control fields such as, for example, a write buffer status flag field 506, a request hint status flag field 508, a done flag field 510, and a validity flag field 512.

Address field 502 is to store an address at which requested data and/or instruction(s) reside. Data field 504 is to store the data and/or instruction(s) at the address of address field 502 once fetched from write buffer 206 or main memory 120. Address field 502 and data field 504 may each have any suitable size.

Write buffer status flag field 506 indicates whether the data and/or instruction(s) requested by the request hint corresponding to entry 500 are stored in write buffer 206. Memory controller interface logic 202 for one embodiment sets write buffer status flag field 506 to indicate a write buffer hit when memory controller interface logic 202 identifies the requested data and/or instruction(s) in write buffer 206. Write buffer status flag field 506 may not be used, for example, where memory controller 112 does not comprise write buffer 206 or where memory controller interface logic 202 updates corresponding data and/or instruction(s) in hint buffer 114 when write buffer 206 is updated. Write buffer status flag field 506 for one embodiment stores a bit.

Memory controller interface logic 202 for one embodiment checks write buffer status flag field 506 to determine whether the requested data and/or instruction(s) for entry 500 are in data field 504 or write buffer 206 when a memory fetch request results in a hit on entry.

Request hint status flag field 508 indicates whether the request hint corresponding to entry 500 has yet been performed by memory controller interface logic 202. Memory controller interface logic 202 for one embodiment sets request hint status flag field 508 to indicate pending when entry 500 is created in hint buffer 114. Memory controller interface logic 202 for one embodiment sets request hint status flag field 508 to indicate completed when memory controller interface logic 202 stores the requested data and/or instruction(s) for the corresponding request hint in data field 504 or identifies the requested data and/or instruction(s) in write buffer 206. Request hint status flag field 508 may not be used, for example, where memory controller interface logic 202 creates entries in hint buffer 114 only after fetching the requested data and/or instruction(s) or identifying the requested data and/or instruction(s) in write buffer 206. Request hint status flag field 508 for one embodiment stores a bit.

Memory controller interface logic 202 for one embodiment checks request hint status flag field 508 to determine the requested data and/or instruction(s) for the corresponding request hint have been stored in data field 504 or identified in write buffer 206 when a memory fetch request results in a hit on entry 500.

Done flag field 510 indicates whether the requested data and/or instruction(s) for entry 500 have been returned in response to a memory fetch request. Memory controller interface logic 202 for one embodiment sets done flag field 510 to indicate done when memory controller interface logic 202 returns the requested data and/or instruction(s) for a memory fetch request that results in a hit on entry 500. Done flag field 510 for one embodiment stores a bit.

Memory controller interface logic 202 for one embodiment checks done flag field 510, for example, to invalidate entry 500.

Validity flag field 512 indicates whether entry 500 is a valid or invalid entry in hint buffer 114. Memory controller interface logic 202 for one embodiment sets validity flag field 512 to indicate validity when entry 500 is created in hint buffer 114, whether or not the requested data and/or instruction(s) for the corresponding request hint have been fetched or identified in write buffer 206. Memory controller interface logic 202 for one embodiment sets validity flag field 512 to indicate invalidity, for example, when the corresponding request hint has not yet fetched the requested data and/or instruction(s) and has been canceled and/or when the requested data and/or instruction(s) are returned for a memory fetch request that resulted in a hit on entry 500. Memory controller interface logic 202 for one embodiment may seek to invalidate entry 500 by checking done flag field 510 periodically and/or when a new entry is to be created in hint buffer 114. Validity flag field 512 for one embodiment stores a bit.

Memory controller interface logic 202 for one embodiment checks validity flag field 512 to ensure entry 500 is valid when a memory fetch request results in a hit on entry 500.

As memory controller interface logic 202 may store in hint buffer 114 one or more entries for which a corresponding memory fetch request has not yet been received for a predetermined period of time or may not be received by memory controller 112 at all, memory controller interface logic 202 for one embodiment may return the requested data and/or instruction(s) for such entries to bus interface logic 210 to store the requested data and/or instruction(s) in secondary cache memory 212 and/or primary cache memory 222. In this manner, memory controller interface logic 202 may continue creating new entries in hint buffer 114 and the requested data and/or instruction(s) for any evicted entries of hint buffer 114 may still be requested.

Figure 6A:
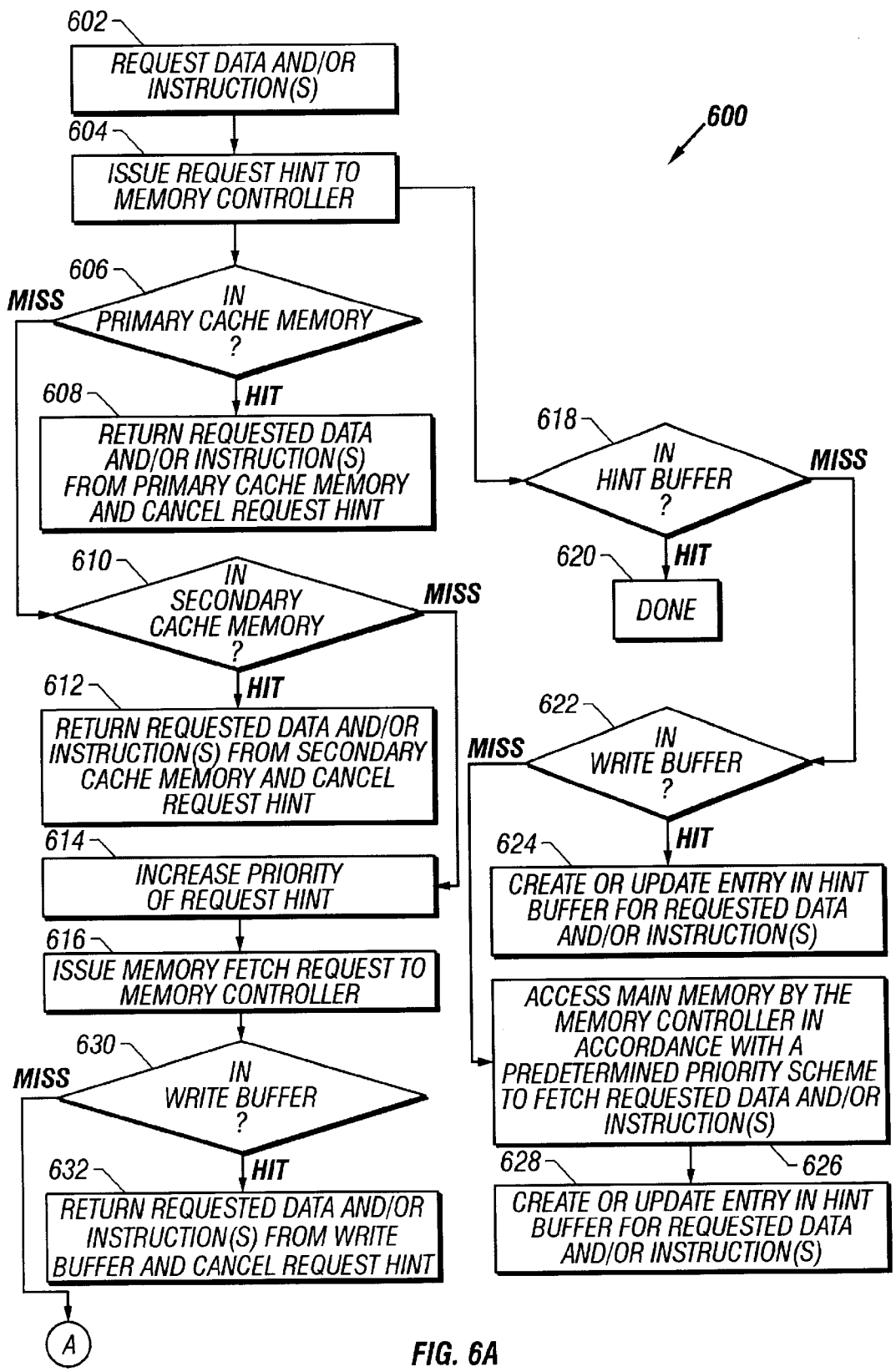
FIG. 6, which is formed by FIGS. 6A and 6B, illustrates, for another embodiment, a flow diagram to perform a memory fetch request using a memory controller comprising a hint buffer.
Figure 6B:
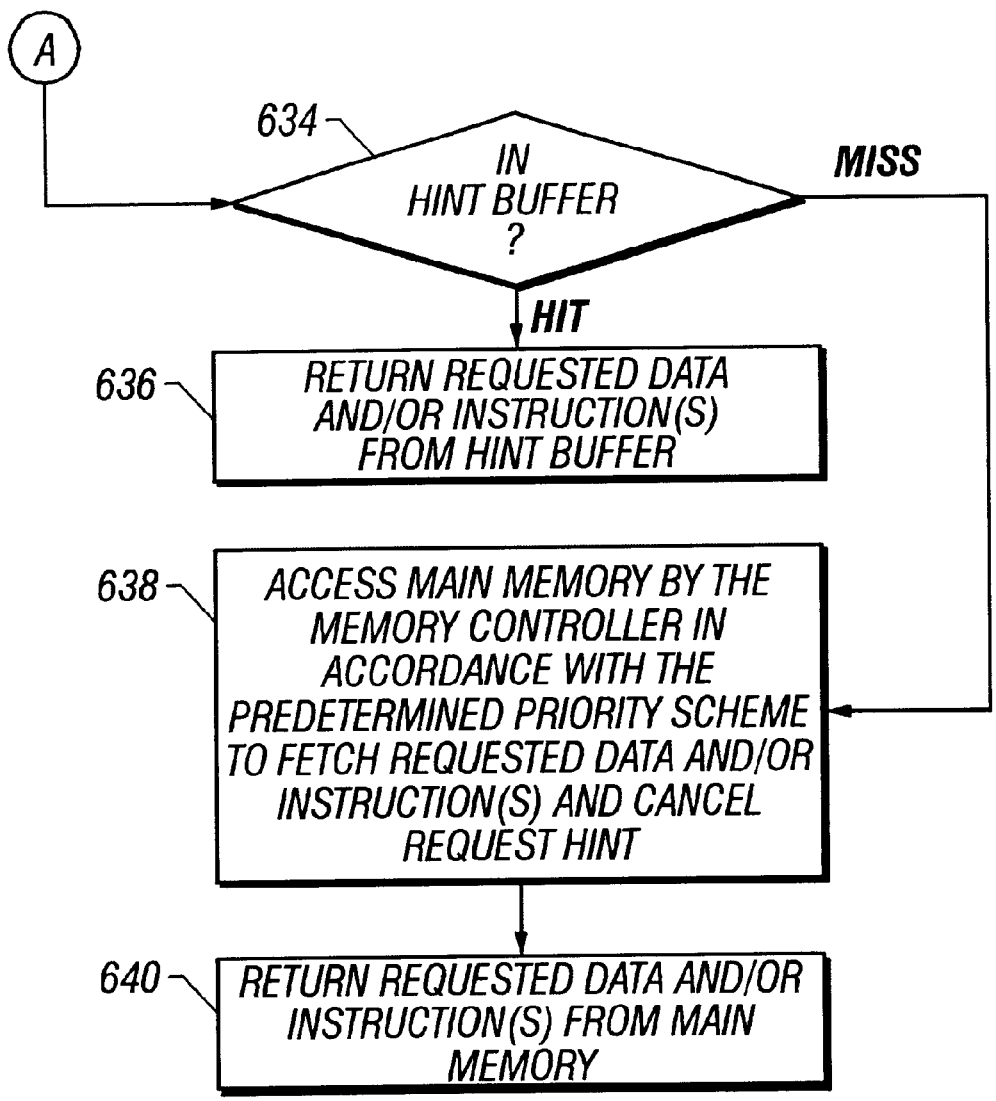

Processor 110 of FIGS. 1 and 2 for another embodiment helps hide latencies in accessing main memory 120 using memory controller 112 in accordance with a flow diagram 600 of FIG. 6. For flow diagram 600, blocks 602, 604, 606, 608, 610, 612, 614, 616, 618, 620, 622, 624, 626, 628, 630, 632, 634, 636, 638, and 640 correspond to blocks 302, 308, 304, 306, 310, 312, 314, 316, 318, 320, 322, 324, 326, 328, 330, 332, 334, 336, 338, and 340 of flow diagram 300 of FIG. 3, respectively.

Instead of issuing a request hint for block 308 of FIG. 3 after a miss in primary cache memory 222, primary cache control logic 220 for flow diagram 600 issues the request hint to memory controller 112 for block 604 prior to or while primary cache control logic 220 identifies whether the requested data and/or instruction(s) are stored in primary cache memory 222 for block 606. In this manner, memory controller 112 has a longer window opportunity to initiate access to main memory 120 to fetch the requested data and/or instruction(s) prior to receiving the memory fetch request. If primary cache memory 222 signals a cache hit, primary cache control logic 220 for block 608 returns the requested data and/or instruction(s) from primary cache memory 222 to instruction processing logic 230. Primary cache control logic 220 for one embodiment may optionally notify memory controller 112 for block 608 to cancel the request hint previously issued to memory controller 112 to avoid unnecessarily accessing main memory 120.

Instruction processing logic 230 for one embodiment may issue the request hint to memory controller 112 for block 604. Processor 110 for one embodiment may comprise a bus coupled between instruction processing logic 230 and memory controller 112 with the bus being substantially dedicated to transmitting request hints to help expedite transmission of the request to memory controller 112. For another embodiment, instruction processing logic 230 may issue request hints through primary cache control logic 220 and bus interface logic 210.

Processor 110 for one embodiment may implement prefetching functionality to help hide memory access latency by issuing prefetch request hints to memory controller 112. Processor 110 for one embodiment may issue suitable request hints to implement next cache line prefetching in cases such as, for example, instruction prefetching, cache line split accesses, and tight loops with uniform strides such as array initialization and memory copy. Processor 110 for one embodiment may also issue prefetch request hints from, for example, microcode or a hardware stride analyzer.

As processor 110 helps hide memory access latency by overlapping the latency incurred in accessing main memory 120 with other latencies incurred internally and may help reduce the average memory access latency by spreading out accesses to main memory 120, processor 110 may process instructions with relatively increased throughput without having to use larger buffers, queues, and/or cache memories.

Although described in the context of processor 110, graphics controller 130 and/or I/O controller 140 of FIGS. 1 and 2 for one embodiment may use memory controller 112 similarly as processor 110 to help hide latencies in accessing main memory 120.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
   receiving a read request to fetch data and/or one or more instructions;
   accessing a primary cache memory to retrieve the requested data and/or one or more instructions in response to the read request;
   accessing a secondary cache memory to retrieve the requested data and/or one or more instructions if there is a cache miss in the primary cache memory;
   substantially concurrently issuing a request hint to fetch the requested data and/or one or more instructions from a main memory while accessing the secondary cache memory and storing the fetched data and/or one or more instructions in a hint buffer; and
   if the requested data and/or instruction(s) are not in the secondary cache memory, returning the data and/or instruction(s) from the hint buffer.

2. The method of claim 1, further comprising:
   identifying whether the requested data and/or instruction(s) are stored in a write buffer in response to the request hint prior to accessing the main memory, the write buffer storing data and/or one or more instructions issued from one or more write requests which are pending to be written to the main memory;
   retrieving the requested data and/or one or more instructions from the write buffer without accessing the main memory, if the requested data and/or one or more instructions are in the write buffer; and
   storing the data and/or one or more instructions retrieved from the write buffer in the hint buffer.

3. The method of claim 2, further comprising increasing a priority of the request hint if the requested data and/or one or more instructions are not in the secondary cache memory and the request hint is still pending.

4. The method of claim 1, wherein if the requested data and/or one or more instructions are not in the secondary cache memory, the method further comprises:
   determining whether the requested data and/or one or more instructions are stored in a write buffer, the write buffer storing data and/or one or more instructions issued from one or more write requests which are pending to be written to the main memory;
   retrieving and returning the requested data and/or one or more instructions from the write buffer if the requested data and/or one or more instructions are found in the write buffer; and canceling the request hint if the request hint is still pending.

5. The method of claim 4, wherein if the requested data and/or one or more instructions are not in the write buffer, the method further comprises:
   determining whether the requested data and/or one or more instructions are in the hint buffer as a result of the request hint which is processed substantially concurrently; and retrieving and returning the requested data and/or one or more instructions from the hint buffer if the requested data and/or one or more instructions are in the hint buffer.

6. The method of claim 5, wherein if the requested data and/or one or more instructions are not in the hint buffer, the method further comprises:
   accessing the main memory in accordance with a predetermined priority to retrieve the requested data and/or one or more instructions;
   canceling the request hint if the request hint is still pending; and
   returning the requested data and/or one or more instructions retrieved from the main memory.

7. An apparatus comprising:
   a primary cache memory;
   a secondary cache memory;
   logic coupled to the primary cache memory and the secondary cache memory to access the primary cache memory to retrieve data and/or instruction(s) in response to a read request for the data and/or instruction(s), to accessing the secondary cache memory if the requested data and/or instruction(s) are not in the primary cache memory, and to substantially concurrently issue a request hint to accessing a main memory to fetch the requested data and/or instruction(s) while accessing the secondary cache memory; and
   a memory controller coupled to the logic and comprising a limit buffer, the memory controller to receive the request hint and to access the main memory to fetch data and/or one or more instructions in response to the request hints to store the accessed data and/or instruction(s) in the hint buffer, and to return to the logic the accessed data and/or instruction(s) from the hint buffer.

8. The apparatus of claim 7, further comprising a write buffer coupled to the memory controller to store data and/or instructions issued by one or more write requests, the data and/or instructions being pending to be written to the main memory via the memory controller.

9. The apparatus of claim 8, wherein the memory controller
   determines whether the requested data and/or instruction(s) are in the write buffer in response to the request hint,
   retrieves the requested data and/or instruction(s) from the write buffer if the requested data and/or instruction(s) are in the write buffer, and
   stores the requested data and/or instruction(s) retrieved from the write buffer in the hint buffer without accessing the main memory.

10. The apparatus of claim 8, wherein if the requested data and/or instruction(s) are not in the secondary cache memory, the memory controller further determines whether the requested data and/or instruction(s) are in the write buffer, retrieves and returns the requested data and/or instruction(s) from the write buffer if
    the requested data and/or instruction(s) are stored in the write buffer, and cancels the request hint if the request hint is still pending.

11. The apparatus of claim 10, wherein if the requested data and/or instruction(s) are not in the write buffer, the memory controller further
    determines whether the requested data and/or instruction(s) are in the hint buffer as a result of the request hint which is processed substantially concurrently, and
    retrieves and returns the requested data and/or instruction(s) from the hint buffer if the requested data and/or instruction(s) are in the hint buffer.

12. The apparatus of claim 11, wherein if the requested data and/or one or more instructions are not in the hint buffer, the memory controller further
    accesses the main memory in accordance with a predetermined priority to retrieve the requested data and/or instruction(s),
    cancels the request hint if the request hint is still pending, and
    returns the requested data and/or instruction(s) retrieved from the main memory.

13. The apparatus of claim 7, wherein if the requested data and/or instruction(s) are not in the secondary cache memory, the memory controller further increases a priority of the request hint if the request hint is still pending.

14. The apparatus of claim 7, wherein the logic comprises cache control logic to issue the request hint.

15. A system comprising:

main memory;

cache memory including a primary cache memory and a secondary cache memory;

logic coupled to the cache memory to request data and/or one or more instructions from the primary cache memory in response to a read request, to access the secondary cache memory if the requested data and/or one or more instructions are not in the primary cache memory, and substantially concurrently to issue a request hint to access the main memory to fetch the requested data and/or one or more instructions while accessing the secondary cache memory; and a memory controller coupled to the logic and to the main memory and comprising a hint buffer, the memory controller to receive the request hint and to access the main memory to fetch data and/or one or more instructions in response to the request hint and store the accessed data and/or instruction(s) in the hint buffer, the memory controller to return to the logic the accessed data and/or instruction(s) from the hint buffer in response to the request hint.

16. The system of claim 15, further comprising a write buffer coupled to the memory controller to store data and/or instructions issued by one or more write requests, the data and/or instructions being pending to be written to the main memory.

17. The system of claim 16, wherein the memory controller determines whether the requested data and/or one or more instructions are in the write buffer in response to the request hint, retrieves the requested data and/one or more instructions from the write buffer if the requested data and/or one or more instructions are in the write buffer, and stores the requested data and/or one or more instructions retrieved from the write buffer in the hint buffer without accessing the main memory.

18. The system of claim 16, wherein if the requested data and/or one or more instructions are not in the secondary cache memory, the memory controller further determines whether the requested data and/or one or more instructions are in the write buffer retrieves and returns the requested data and/or one or more instructions from the write buffer if the requested data and/or one or more instructions are in the write buffer cancels the request hint if the request hint is still pending.

19. The system of claim 18, wherein if the requested data and/or one or more instructions are not in the write buffer, the memory controller further determines whether the requested data and/or one or more instructions are in the hint buffer as a result of the request hint which is processed substantially concurrently, and retrieves and returns the requested data and/or one or more instructions from the hint buffer if the requested data and/or one or more instructions are in the hint buffer.

20. The system of claim 19, wherein if the requested data and/or one or more instructions are not in the hint buffer, the memory controller further accesses the main memory in accordance with a predetermined priority to retrieve the requested data and/or one or more instructions, cancels the request hint if the request hint is still pending, and returns the requested data and/or one or more instructions retrieved from the main memory.

21. The system of claim 15, wherein if the requested data and/or one or more instructions are not in the secondary cache memory, the memory controller further increases a priority of the request hint if the request hint is still pending.

22. The system of claim 15, wherein the logic comprises cache control logic to issue the request hint.

23. The system of claim 15, wherein the cache memory, the logic, and the memory controller are integrated.

* * * * *

UNITED STATES PATENT AND TRADEMARK OFFICE
CERTIFICATE OF CORRECTION

PATENT NO. : 6,718,440 B2
DATED : April 6, 2004
INVENTOR(S) : Maiyuran et al.

It is certified that error appears in the above-identified patent and that said Letters Patent is hereby corrected as shown below:

Column 6,
Line 17, delete "limit" and insert -- hint --.
Line 20, delete "hints" and insert -- hint, --.

Column 18,
Line 10, after "buffer", insert -- and --.

Signed and Sealed this

Sixth Day of July, 2004

JON W. DUDAS
*Acting Director of the United States Patent and Trademark Office*